May 16, 1967 E. S. L. BEALE 3,320,382
DEVICES RESPONSIVE TO FLUID FLOW
Filed Oct. 13, 1965 2 Sheets-Sheet 1
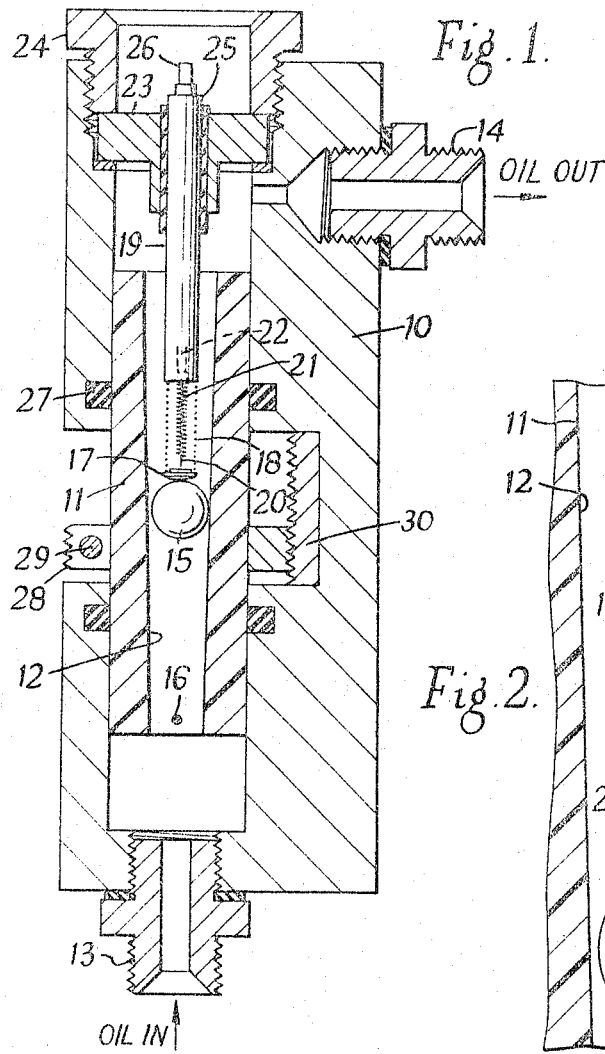
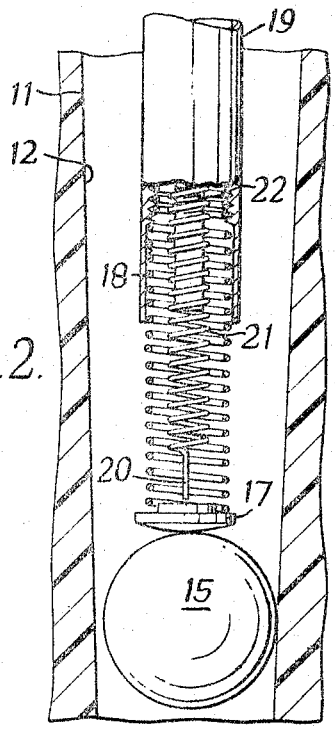
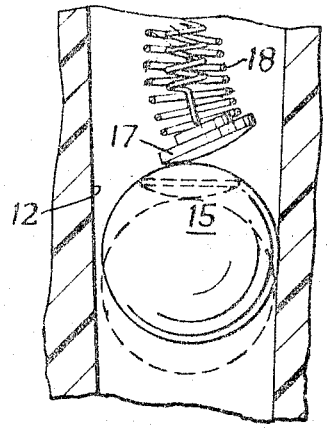
INVENTOR
Evelyn S. L. Beale
BY
Kenyon, Palmer, Stewart & Estabrook
ATTORNEYS

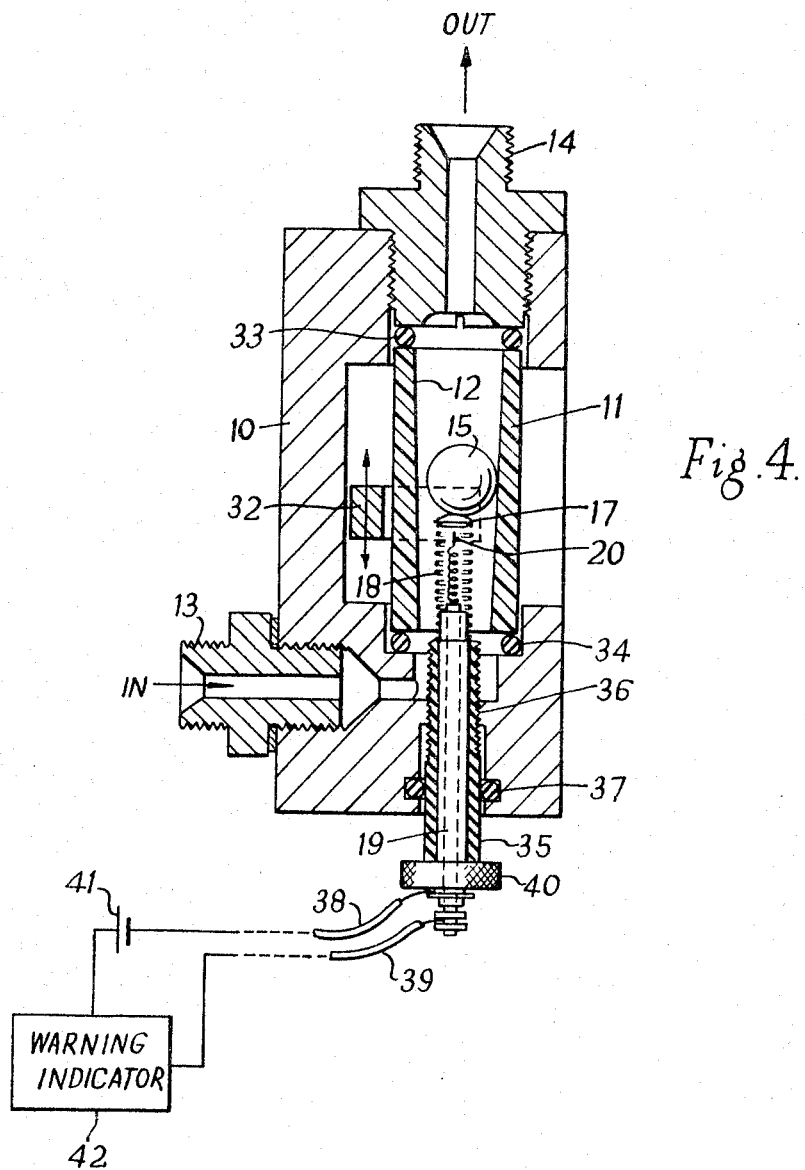

United States Patent Office 3,320,382
Patented May 16, 1967

3,320,382
DEVICES RESPONSIVE TO FLUID FLOW
Evelyn S. L. Beale, Staines, England, assignor to Alan Muntz & Company Limited, Feltham, England
Filed Oct. 13, 1965, Ser. No. 495,504
Claims priority, application Great Britain, Jan. 8, 1965, 1,007/65; July 14, 1965, 29,913/65
11 Claims. (Cl. 200—81.9)

The present invention relates to devices responsive to fluid flow and more particularly to devices for indicating an interruption in the flow of a fluid. The invention has especial advantages for giving warning of failure of oil flow in an engine-lubricating system or for indicating an excessive increase of fluid flow.

One known fluid-flow indicator described and claimed in the specification of our British Patent No. 951,762 makes use of a ball in a tube which is usually mounted with its axis vertical and the bore of which is tapered in such a manner that it decreases in an upward direction. The fluid is fed in at the bottom of the tube and out from the top and the height of the ball is a measure of the rate of flow of the fluid. The tube is transparent and the ball can be viewed through the tube wall.

One of the good features of this arrangement is that it has been found by practical experience that the ball does not get jammed in the tube as a result of dirt in the oil. The explanation of this freedom from mechanical jamming is not fully understood, but it is thought to be due to the fact that the ball can roll and twist in various directions, so that it can get out of the way of a piece of grit or alternatively allow the grit to be pushed past the ball.

The present invention has for its principal object to provide a device for giving warning of interruption of fluid flow and which retains the good feature above referred to of the known device.

According to the present invention there is provided a device responsive to fluid-flow comprising a tube (which in use is normally arranged with its axis vertical) having within it a spherical ball of diameter substantially less than that of the bore, or at least part of the bore, of the tube, a fluid inlet to the tube beneath the ball, a fluid outlet from the tube above the ball and an electrical contact assembly mounted above (or below) the ball, the contact assembly comprising a shoe having a convex lower (or upper) surface so mounted as to be resiliently yielding in both vertical and lateral directions and to be engaged by the top (or bottom) of the ball and having at least part of its upper (or lower) surface electrically conducting, a contact member arranged to make (or break) electrical contact with the conducting part of the shoe when the ball lifts the shoe (or allows the shoe to rise) by a predetermined amount and so mounted as to be resiliently yielding in both vertical and lateral directions, and means for making electrical connections between the conducting part of the shoe and the contact member respectively and terminals outside the tube.

When it is required to provide a device which indicates an excessive increase of fluid flow and which fails safe, the form of the invention defined by the bracketted alternatives in the preceding paragraph is used. In practice it is only necessary to invert the spring contact assembly in comparison with its position in flow-failure indicator and arrange it below instead of above the ball.

In use the terminals may be connected in circuit with a current source and a warning or indicating device which may give a visual or audible warning of the opening and closing of the circuit.

The shoe preferably has a part-spherical under surface and may be made wholly of metal or of insulating material having a conducting coating over at least a part of its upper surface.

The resilient mountings are preferably provided by coaxial helical springs and the said means for making electrical connections may include the said springs.

In use the ball tends to roll along the inside of the wall of the tube in response to fluid flow and the transverse stiffness of the helical springs is preferably made much smaller than (for example not more than about one tenth of) the axial stiffness, so that the ball is able to roll along the tube bore without slip and to roll over the surface of the shoe without slip, thereby causing the shoe to rock and move transversely of the tube axis.

The invention will be described, by way of example, with reference to the accompanying drawings, in which FIG. 1 is a somewhat diagrammatic view in section of one embodiment of the invention, suitable for use in giving warning of failure of oil flow in an engine lubricating system, FIG. 2 is an enlarged view of the ball, shoe and contact assembly of FIG. 1, FIG. 3 is a view of part of FIG. 2 showing the effect of upward movement of the ball after its engagement with the shoe, and FIG. 4 is a somewhat diagrammatic view in section of another embodiment of the invention suitable for indicating excessive increase of fluid flow and which fails safe.

Referring to the drawings, a warning device is illustrated in FIGS. 1 to 3 suitable for use in indicating failure of oil flow, the device comprising a body 10 having mounted in a bore therein a tube 11 of transparent material having a tapering bore 12, an oil inlet 13 and an oil outlet 14. Within the tube 11 is a spherical ball 15 which is prevented from falling out of the bottom of the tapered bore by a stop 16.

As best shown in FIG. 2, when oil flow causes the ball 15 to rise, it engages a shoe 17 mounted at the lower end of a helical metal spring 18 the upper end of which is fixed to a metal tube 19 which itself is fixed relative to the body 10. The tube 19 may be internally threaded in order to enable the upper end of the spring 18 to be screwed into it and in this way fixed to the tube 19. The shoe 17 may be wholly of metal or it may have a metal coating on its upper surface connecting with the spring 18. The shoe 17 preferably has a part-spherical under surface to engage the ball 15.

A contact member 20 is mounted on the lower end of a further helical metal spring 21 within and coaxial with the spring 18, and having its upper end fixed to a metal rod 22. The rod 22 may be threaded and the spring 21 may be screwed on to the thread in order to fix it to the rod. The rod 22 is located within and is insulated from the tube 19. The tube is mounted in an aperture in a cap 23 secured in the top of the body by a ring nut 24. The mounting is such that a pressure-tight closure is provided at the top of the body. The lower end of the contact member 20 which in use engages the upper surface of the shoe 17 is of small radius, for instance 0.5 mm. The upper end 25 of the tube 19 and the upper end 26 of the rod 22 constitute terminals by which the device may be connected in an alarm circuit (for example as indicated diagrammatically in FIG. 4) these terminals being connected, respectively, to the shoe 17 and the contact member 20.

In operation, as best seen in FIGS. 2 and 3, the ball 15 rises to an extent dependent upon the rate of flow of oil through the bore 12. As it rises from the broken line position in FIG. 3 to the full line position it rolls along the tube bore 12 without slip and deflects and raises the shoe 17 against the action of the spring 18.

The transverse flexibility of the springs 18 and 21 is made high enough to ensure that as the ball rises in the tube, rolling against one side of it, and makes contact with the shoe, it can continue to roll against the side of the tube, carrying the shoe transversely in rolling contact with the top of the ball (towards the same side of the tube) without slipping and with little increase in the tendency to slip.

After the contact is made with the contact member 20 on the inner spring 21 the bottom ends of the two springs move up together, and their combined transverse flexibility is still great enough to allow the shoe to be moved transversely without slipping as the ball continues to roll upwards along one side of the tube. The ball can also twist so as to touch the tube at a different point at the same height, again rolling without slipping. Thus the shoe pressing down on the ball will interfere as little as possible with its freedom of movement.

Apart from the possible but unlikely mechanical jamming of the ball in the "up" position this arrangement ensures that the device will "fail safe" in the following way. A normal flow of oil will be indicated by the contact being made, operating an indicator lamp or other device. Failure of the flow will result in the indicating device not operating, thereby indicating an unsafe condition. Similarly any other electrical circuit failure will also indicate an unsafe condition, e.g. dirt between the contacts, failure of the indicating lamp, a break in the circuit or failure of power supply. Thus the indication will be that of an unsafe condition which requires investigation, that is the cause of the failure of the oil flow or of the fault in the warning device.

This flow failure warning device is especially suitable for use with mechanical lubricators which produce a pulse of oil at regular intervals with a substantial interval between pulses when there is no oil flow. The result of this is that the ball rises and falls in the tube, giving a visual indication by its motion in the tube and simultaneously an electrical signal in the form of a succession of makes and breaks in the circuit. In each case the dynamic nature of the indication is a further safeguard against failure without warning, as well as contributing substantially to the freedom of mechanical sticking of the ball in the tube.

The indications given by the flow failure warning device described may take various forms, the simplest one being a circuit through the device to operate a warning lamp which flashes on and off regularly as the mechanical lubricator operates. In the case of a batch of indicators all operated from a single row of pump plungers operating simultaneously, all the pairs of contacts may be connected in series, so that the failure of any one of them to make contact will give warning on a single lamp or other indicator.

A somewhat more elaborate warning scheme, which is likely to be wanted in many cases, is one in which a single warning, visual or audible, is given by the failure of any one of a large number of individual or groups of devices, according to the present invention of which about 100 may be used on a large marine diesel engine. If the pulsating nature of the indications given this device is to be retained, each pulsation may be used to operate a counting device, which is re-set to zero once every revolution of the lubricators. If the correct total number of signals is received during each revolution, a warning relay is held off, but if the count is one or more short of the correct number, the relay would give a suitable general warning.

A minor feature in the design of the embodiment described is that the flow of oil past the ball continues upwards outside the outer spring 18, so that the coils of this spring provide some protection against dirt, etc., getting between the contacts, i.e. on to the upper surface of the shoe. Another feature is that the contact member 20 is in the form of a fairly sharp point, so that a given force on the ball produces the maximum contact pressure to cut through any dirt that may have been deposited either mechanically or by corrosion of the metal surfaces.

One obvious feature in the design of the springs is that since the axial flexibility of the inner spring 21 is much less than that of the outer spring 18, a large proportion of the force between the ball and the shoe is transmitted to the contact point on the inner spring. In fact the function of the outer spring 18 is primarily to provide an electrical connection to the lower contact and to hold the spherical ended shoe in place, i.e. at the desired height and coaxial in the tube before the ball makes contact with it.

The adjustment of the springs when not in contact with the ball is such that there is a reasonably small gap between the contacts, preferably approximately ½ to 1 mm., chosen to provide an adequate separation of the contacts to ensure that the contact is broken, but at the same time to require only a reasonably small upward movement of the ball due to the flow of oil from the lubricator before electrical contact is made.

The diameters of the two springs are so chosen that there is plenty of clearance between the outer spring and the bore of the tube, and between the inner spring and the outer spring, so as to ensure contact between the point on the inner spring and the shoe to occur without interference. One obvious design feature to allow the greatest amount of free rolling motion to the ball is that the shoe and the outside diameter of the outer spring should be about half the bore of the tube at the mean point of operation, so that the point of contact between the ball and the shoe, starting near the centre, reaches the edge of the shoe at the same time as the other edge of the shoe touches the wall of the tube. In one example the ball is 8 mm. in diameter.

If desired the two springs 18 and 21 may be wound as right-handed and left-handed helices, so that when compressed axially, the free ends rotate slightly in opposite directions, thereby helping to keep contact surfaces clean and free from dirt, which might prevent a good electrical contact.

The materials used for the contacting parts of the shoe 17 and contact member 20 may be such as are commonly used for such purposes.

The ball 15 may be of metal, for example, aluminium, or a suitable plastics material and is preferably as light as possible.

When the device is used with a pulsating oil feed it is desirable that the on and off intervals should be approximately equal.

It is desirable to provide means for adjusting the device for operation over a range of different rates of flow. A preferred way of achieving this result is shown in FIG. 1. The tube 11 is made slidable axially in the bore in the body 10 and is pressure-sealed by means such as O-rings 27.

The tube 11 should be capable of operation at a large internal pressure, for instance up to 2000 to 3000 p.s.i. and in order that the tube may be as strong as possible for its dimensions and the material used its outer surface should be as smooth as possible. This makes it difficult to move the tube axially by gripping it between the fingers. There is therefore provided on the tube a movable collar 28 in a space formed in the body between the two seals 27.

The collar 28 may be split and provided with either a clamping screw 29 as shown or a spring ring such as a circlip so as to grip the tube. The outer edge of the collar may be knurled for adjustment by finger and thumb, or alternatively it may be provided with tommy-bar holes. Some simple clamping or locking device can easily be fitted to prevent the tube moving, once it has been adjusted, this device engaging with the external surface of the collar.

In the embodiment shown in FIG. 1, a screw adjustment is provided. For this the outside of the collar 28 is provided with a screw thread engaging in a rack 30 fixed to the body. By rotating the tube 11 it can be be raised and lowered as desired.

In order to provide for an axial movement of the tube 11 of about ¼ inch without movement of the collar 28 a collar of ¼ inch width has been found suitable. By loosening the screw 29 the collar can be moved axially to provide a coarse adjustment of the position of the tube 11.

Referring now to FIG. 4, this shows an arrangement according to the invention for indicating excessive increase in oil flow. In FIG. 4 parts having the same function as those in FIGS. 1 to 3 are given the same references. In FIG. 4, oil enters at an inlet 13, passes through a transparent tube 11 having a tapering bore 12 and emerges through an outlet 14. The spring contact assembly comprising an outer spring 18 carrying a shoe 17 and an inner spring 21 having a contact member 20 at its end is as already described; but, as shown, it is arranged below the ball 15 and the contact between the shoe 17 and contact member 20 is closed until the oil flow increases beyond a predetermined value, when the contacts open and operate an alarm or other indicator.

In this device it is required that the ball 15 should have a relatively large effective weight. It may be made of solid metal and the force of gravity relied upon or it may be made of iron or a soft ferrite and a U-shaped magnet 32 may be provided, as shown, to exert a downward pull and assist the action of gravity. The position of the magnet may be made adjustable in a direction parallel to the tube axis.

Another modification is to the means for adjusting the relative position of the spring assembly and tube 11, this being also applicable to the device of the earlier specification and being especially suitable when only a small range of adjustment is required. In the device here illustrated the tube 11 is fixed within the body 10 by clamping it between O rings 33, 34. The tube 19 carrying the outer spring 18 is fixed within an insulating sleeve 35 which is externally threaded and engages in an internally threaded part 36 of the body 10. The sleeve 35 is sealed within the body by means of an O ring 37. Connection with the outer spring 18 and hence with the shoe 17 is made by a lead 38 and connection with the contact member 20 is made by a lead 39. The leads 38 and 39 may be connected, as shown in series with a current source 41 to a warning indicator 42 of any convenient kind. Both these leads 38 and 39 are insulated from the body 10 and this may be of advantage in some cases. For instance a number of the indicators described may be connected in series across a relay or an indicator lamp which itself is connected in series with a resistor across a current source. While the contacts remain closed, that is while the oil flow is below the predetermined value at which alarm is to be given, these contacts short-circuit the relay or indicator.

The device is adjusted by turning a knob 40 fixed to the tube 19 and sleeve 35 in such a way that the ball 15 keeps the contacts closed until the alarm rate of flow is reached.

Although the invention has been described with particular reference to pulsating fluid flow it may be used alternatively with continuous fluid flow.

I claim:

1. A device responsive to fluid flow comprising a tube, a spherical ball of diameter substantially less than that of the bore of said tube arranged within said bore, a fluid inlet to said bore on one side of said ball, a fluid outlet from said bore on the opposite side of said ball, an electrical contact assembly mounted within said bore, said contact assembly including a shoe, means resiliently supporting said shoe for movement in an axial direction parallel to the axis of said tube bore and in a direction transverse with respect to said axis, said shoe having a convex surface to engage said ball and having a portion of its surface electrically conducting, a contact member positioned in said bore to engage said conducting portion of said shoe, means resiliently supporting said contact member for movement in a direction parallel to said axis and in a direction transverse with respect to said axis, terminals disposed outside said bore, and means for making electrical connections between said conducting portion and said contact member, on the one hand, and said terminals on the other hand.

2. A device according to claim 1, wherein said bore is tapered.

3. A device according to claim 2, for use with said axis vertical, wherein the diameter of said bore increases in an upward direction.

4. A device according to claim 1, wherein said means for resiliently supporting said shoe comprise a helical spring.

5. A device according to claim 4, wherein said means for resiliently supporting said contact member comprise a helical spring.

6. A device according to claim 5, wherein said helical springs are disposed coaxially, one within the other.

7. A device according to claim 1, for use with said axis vertical, wherein said shoe is disposed above said ball and wherein said contact member is disposed above said shoe, electrical connection being made between said conducting portion and said contact member when said ball is lifted a predetermined distance by fluid flow.

8. A device according to claim 1, for use with said axis vertical, wherein said shoe is disposed beneath said ball with said conducting portion thereof held by the weight of said ball in contact with said contact member.

9. A device according to claim 1 comprising a body and means mounting said contact assembly from said body, said tube being slidably mounted in said body to permit adjustment of the position of said ball at which said contact member makes contact with said conducting portion.

10. A device according to claim 1 comprising a body and means adjustably mounting said contact assembly upon said body, said tube being fixed to said body, said adjustable mounting permitting adjustment of the position of said ball at which said contact member makes contact with said conducting portion.

11. A device responsive to fluid flow comprising a tube, a spherical ball of diameter substantially less than that of the bore of said tube arranged within said bore, a fluid inlet to said bore on one side of said ball, a fluid outlet from said bore on the opposite side of said ball, an electrical contact assembly mounted within said bore, said contact assembly including a shoe, means resiliently supporting said shoe for movement in an axial direction parallel to the axis of said tube bore and in a direction transverse with respect to said axis, said shoe having a convex surface to engage said ball and having a portion of its surface electrically conducting, a contact member positioned in said bore to engage said conducting portion of said shoe, terminals disposed outside said bore, and means for making electrical connections between said conducting portion and said contact member, on the one hand, and said terminals on the other hand.

References Cited by the Examiner

UNITED STATES PATENTS 2,747,042  5/1956  Zimmerman _____ 200—81.9

BERNARD A. GILHEANY, *Primary Examiner.*

H. BROOME, *Assistant Examiner.*